United States Patent
Kakosimos et al.

(10) Patent No.: US 11,527,979 B2
(45) Date of Patent: Dec. 13, 2022

(54) METHOD OF CONTROLLING A MULTI-PHASE ELECTRICAL MACHINE

(71) Applicant: ABB Schweiz AG, Baden (CH)

(72) Inventors: Panagiotis Kakosimos, Västerås (SE); Rahul Kanchan, Västerås (SE)

(73) Assignee: ABB Schweiz AG, Baden (CH)

( * ) Notice: Subject to any disclaimer, the term of this patent is extended or adjusted under 35 U.S.C. 154(b) by 193 days.

(21) Appl. No.: 17/107,246

(22) Filed: Nov. 30, 2020

(65) Prior Publication Data

US 2021/0167708 A1 Jun. 3, 2021

(30) Foreign Application Priority Data

Dec. 3, 2019 (EP) ..................................... 19213083

(51) Int. Cl.
| | |
|---|---|
| H02P 1/32 | (2006.01) |
| H02P 3/00 | (2006.01) |
| H02P 21/22 | (2016.01) |
| H02P 25/22 | (2006.01) |
| H02P 27/12 | (2006.01) |

(52) U.S. Cl.
CPC .............. *H02P 21/22* (2016.02); *H02P 25/22* (2013.01); *H02P 27/12* (2013.01)

(58) Field of Classification Search
CPC ........... H02P 21/22; H02P 25/22; H02P 27/12
USPC ....................................................... 318/496
See application file for complete search history.

(56) References Cited

U.S. PATENT DOCUMENTS

| | | |
|---|---|---|
| 2004/0075406 A1 | 4/2004 | Nakai et al. |
| 2017/0019048 A1* | 1/2017 | Furukawa ............... H02P 27/08 |
| 2017/0126153 A1* | 5/2017 | Lepka ........................ H02P 6/12 |
| 2019/0356256 A1* | 11/2019 | Lamsahel ............... H02P 25/22 |

FOREIGN PATENT DOCUMENTS

DE 112015001258 T5 12/2016

OTHER PUBLICATIONS

R. Gregor, et al; "Speed Sensorless Control of Dual Three-Phase Induction Machine based on a Luenberger Observer for Rotor Current Estimation"; IECON 2012—38th Annual Conference on IEEE Industrial Electronics Society; Oct. 25-28, 2012; 6 Pages.

(Continued)

*Primary Examiner* — Erick D Glass
(74) *Attorney, Agent, or Firm* — Whitmyer IP Group LLC

(57) ABSTRACT

A method of controlling a 3n-phase electrical machine (7) by means of n power converters (3a, 3b) each being controlled by a respective controller, and each power converter (3a, 3b) being configured to power a respective set of three phases of the electrical machine (7), wherein the method for each controller comprises: a) obtaining measured currents (ia,1, ib,1, ic,1, ia,2, ib,2, ic,2) of the set of three phases of the electrical machine (7) controlled by the controller, b) estimating all currents ($\hat{\imath}$dq, 2, $\hat{\imath}$dq, 1) of all the other sets of three phases of the electrical machine (7), which are controlled by the other controllers, c) transforming the measured currents (ia,1, ib,1, ic,1, ia,2, ib,2, ic,2) and all the estimated currents ($\hat{\imath}$dq,2, $\hat{\imath}$dq,1) using vector space decomposition, VSD, to obtain a set of VSD currents, and d) controlling the corresponding power converter based on the VSD currents.

17 Claims, 2 Drawing Sheets

(56) References Cited

OTHER PUBLICATIONS

Eduardo Prieto-Araujo, et al; "Decentralized Control of a Nine-phase Permanent Magnet Generator for Offshore Wind Turbines" IEEE Transactions on Energy Conversion, vol. 30, No. 3; Sep. 1, 2015; 13 Pages.
Alessandro Galassini, et al; "Distributed Speed Control for Multi-Three Phase Electrical Motors with Improved Power Sharing Capability"; 2017 IEEE Energy Conversion Congress and Exposition (ECCE); Oct. 1-5, 2017; 6 Pages.
Ivan Zoric, et al; "Arbitrary Power Sharing Among Three-Phase Winding Sets of Multiphase Machines"; IEEE Transactions on Industrial Electronics XP55691979A, vol. 65, No. 2; Feb. 1, 2018; 12 Pages.
Alessandro Galassini; "Distributed Speed Control for Multi-Three-Phase Motors with Enhanced Power Sharing Capabilities"; PhD Thesis, University of Nottingham; Jan. 2018; 185 Pages.
Extended European Search Report; Application No. 19213083.9; dated May 7, 2020; 9 Pages.

\* cited by examiner

METHOD OF CONTROLLING A MULTI-PHASE ELECTRICAL MACHINE

TECHNICAL FIELD

The present disclosure generally relates to multi-phase electrical machines and in particular to a method of controlling a multi-phase electrical machine.

BACKGROUND

In the literature, there are two main theories for the control of 3n-phase machines. These are the what is often referred to as the dual three-phase (DTP) and the vector space decomposition (VSD) theories. The latter is a comprehensive way of controlling a multi-phase machine by means of multiple drives. Specifically, the VSD transform provides insight about the low-order harmonics. Thus, it enables the controller to eliminate them and improve the machine current in terms of quality.

The control of a multi-phase machine using the VSD approach requires the execution of some basic transformations in the machine currents. The VSD transform provides mutually orthonormal subspaces of the fundamental frequency and lower harmonics. In case of a dual three-phase machine, the six measured currents are typically first transformed to the $\alpha\beta$, the xy, and the $o_1o_2$ subspaces by VSD transformation, and then to the dq domain. The $\alpha\beta$ subspace is the subspace which contains the fundamental frequency plus the $h^{th}$ harmonic, $h=12$ m±1 and m=1, 2, 3 . . . , the xy subspace is the subspace which contains the kth harmonic, $k=12l\pm5$, $l=0, 1, 2, 3 \ldots$, i.e. the $5^{th}$ harmonic and so on, and the $o_1o_2$ subspace is the subspace for all the zero sequence harmonics. In case for example of a 6-phase electrical machine the $3^{rd}$ harmonic is zero if the two neutrals are not connected, and if the neutrals are connected, the $o_1o_2$ subspace is the subspace for the $3^{rd}$ harmonic.

By using several parallel proportional-integral regulators, the voltage references for each different harmonic subspace can be calculated. For the VSD transform to be applied, information of all the machine currents is needed. Therefore, a central controller which receives the measured currents and generates the voltage references or control signals is required. Afterward, each drive receives control signals and produces the switching pulses independently.

SUMMARY

Owing to the aforementioned reasons, the VSD approach cannot be applied to cases where a master-follower configuration is required for improved redundancy. A communication link of high bandwidth is needed for exchanging information about the phase currents from the master to the follower, and vice versa. Also, when the main controller is subjected to a fault, the remaining drive(s) cannot continue to operate and drive the healthy winding set(s) of the electrical machine because the machine is centrally controlled.

In view of the above, an object of the present disclosure is to provide a method of controlling a multi-phase electrical machine which solves, or at least mitigates, the problems of the prior art.

There is hence according to a first aspect of the present disclosure provided a method of controlling a 3n-phase electrical machine by means of n power converters each being controlled by a respective controller, and each power converter being configured to power a respective set of three phases of the electrical machine, wherein the method for each controller comprises: a) obtaining measured currents only of the set of three phases of the electrical machine controlled by the respective controller, b) estimating all currents of all the other sets of three phases of the electrical machine, which are controlled by the other controllers, c) transforming the measured currents and all the estimated currents using vector space decomposition, VSD, to obtain a set of VSD currents, and d) controlling the corresponding power converter based on the VSD currents.

The coupling effects among the winding sets of the 3n-phase electrical machine may thereby be minimised, even when a master-follower configuration is used. Further, the power converters can operate independently without the need for a central controller or a communications link. Moreover, the fault tolerance is improved in case the main controller goes out of operation, and enables current sharing.

The estimated currents are components corresponding to all the other sets of three phases controlled by the other controllers. The estimated currents may be represented by a vector in the rotor reference frame or in the stator reference frame.

According to one embodiment in step b) all the currents are estimated using a current reference vector of the fundamental frequency subspace for all the power converters obtained by VSD transformation and the measured currents to obtain the estimated currents.

According to one embodiment the estimated currents are obtained by subtracting the measured currents from the current reference vector of the fundamental frequency subspace transformed to the stator reference frame and multiplied by n.

One embodiment comprises transforming the measured currents and the estimated currents to a rotor reference frame and using these in step c) to obtain the VSD currents.

One embodiment comprises combining the VSD currents with setpoint current values to obtain control errors, and obtaining control signals based on the control errors, wherein in step d) the controlling is based on the control signals.

One embodiment comprises transforming the control signals from a rotor reference frame to the abc reference frame using inverse VSD to obtain the control signals in the abc reference frame only for the controller in question.

There may according to one variation be an intermediate step of transforming the control signals from the rotor reference frame to the stator reference frame, and transforming the control signals from the stator reference frame to the abc reference frame using inverse VSD.

According to one embodiment n is equal to 2.

According to one embodiment in step a) the obtained measured currents are only of the set of three phases of the electrical machine controlled by the respective controller.

According to one embodiment the method for each controller further comprises: obtaining measured currents of the set of three phases of the electrical machine controlled by the other controller or controllers, comparing the sum of measured currents of the set of three phases of the electrical machine controlled by the other controller or controllers with the sum of the estimated currents, and concluding, on the basis that the measured currents differs from the estimated currents by more than a threshold value, that a fault is present.

In embodiments where n is larger than 2, the currents of all the 3*(n−1) windings can be estimated summed together. The estimated summed currents may then be shared based on the power sharing of the power converters, which is known in all the controllers. Vector components of the estimated summed currents may hence be identified and associated with different power converters based on the power sharing of the power converters. Based on this identification and association, the VSD transform may be performed in step c).

There is according to a second aspect of the present disclosure provided a computer program comprising computer code which when executed by processing circuitry of a control system causes the control system to perform the steps of the method according to the first aspect.

There is according to a second aspect provided a system for controlling a 3n-phase electrical machine by means of n power converters, each power converter being configured to control a respective set of three phases, wherein the control system comprises n controllers each configured to control a respective power converter by performing the steps of the method of the first aspect.

There is according to a third aspect provided an electrical machine system comprising: a 3n-phase electrical machine, n power converters configured to be connected to the electrical machine for controlling respective sets of three phases of the electrical machine, and a control system according to the second aspect, wherein each of the n controllers is configured to control a respective power converter.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the "element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
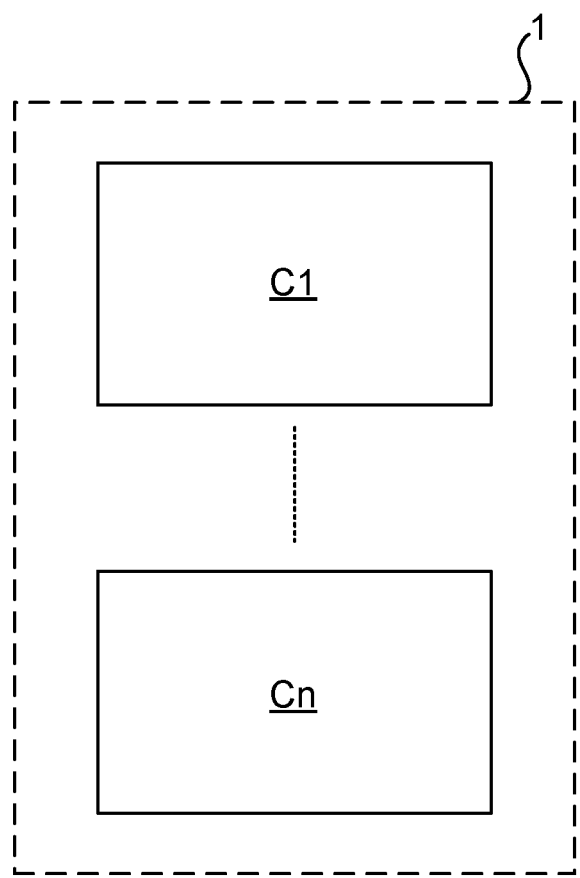
FIG. 1 schematically shows an example of a control system for controlling an electrical machine.

FIG. 1 shows an example of a control system 1 for controlling a multi-phase electrical machine, such as a multi-phase motor or a multi-phase generator, having a stator and a rotor, by means of n power converters, such as n drives. By a multi-phase electrical machine is meant an electrical machine with more than three electrical phases. The multi-phase machine may be a 3n-phase machine, where n is an integer equal to or greater than 2. The electrical machine may be a synchronous machine or an asynchronous machine.

The control system 1 comprises a plurality of controllers C1 to Cn. Each controller C1 to Cn is configured to control a respective set of phases of the multi-phase machine by means of a respective power converter. Each controller C1 to Cn may for example be configured to control a respective set of three phases of the electrical machine.

The control system 1 comprises processing circuitry. The controllers C1 to Cn may be implemented by means of the processing circuitry. Depending on the type of processing circuitry, the control system may also comprise one or more storage medium. The one or more storage medium 3 comprises computer code which when executed by the processing circuitry causes the control system 1 to perform the steps of the methods described herein.

The processing circuitry may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning control of an electrical machine by means of n power converters.

The/each storage medium may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Each controller C1 to Cn may comprise a communications interface including an input device and an output device. The input device is configured to receive respective measured currents of electrical phases of the electrical machine that are controlled by the controller in question. For each controller, the measured currents can be obtained from one or more current sensors arranged to measure the currents of the corresponding electrical phases of the electrical machine. The measured currents are typically stator currents. The controllers are configured to process the respective measured currents to obtain control signals. Each output device is configured to transmit the control signals to control the corresponding power converter.

Figure 2:
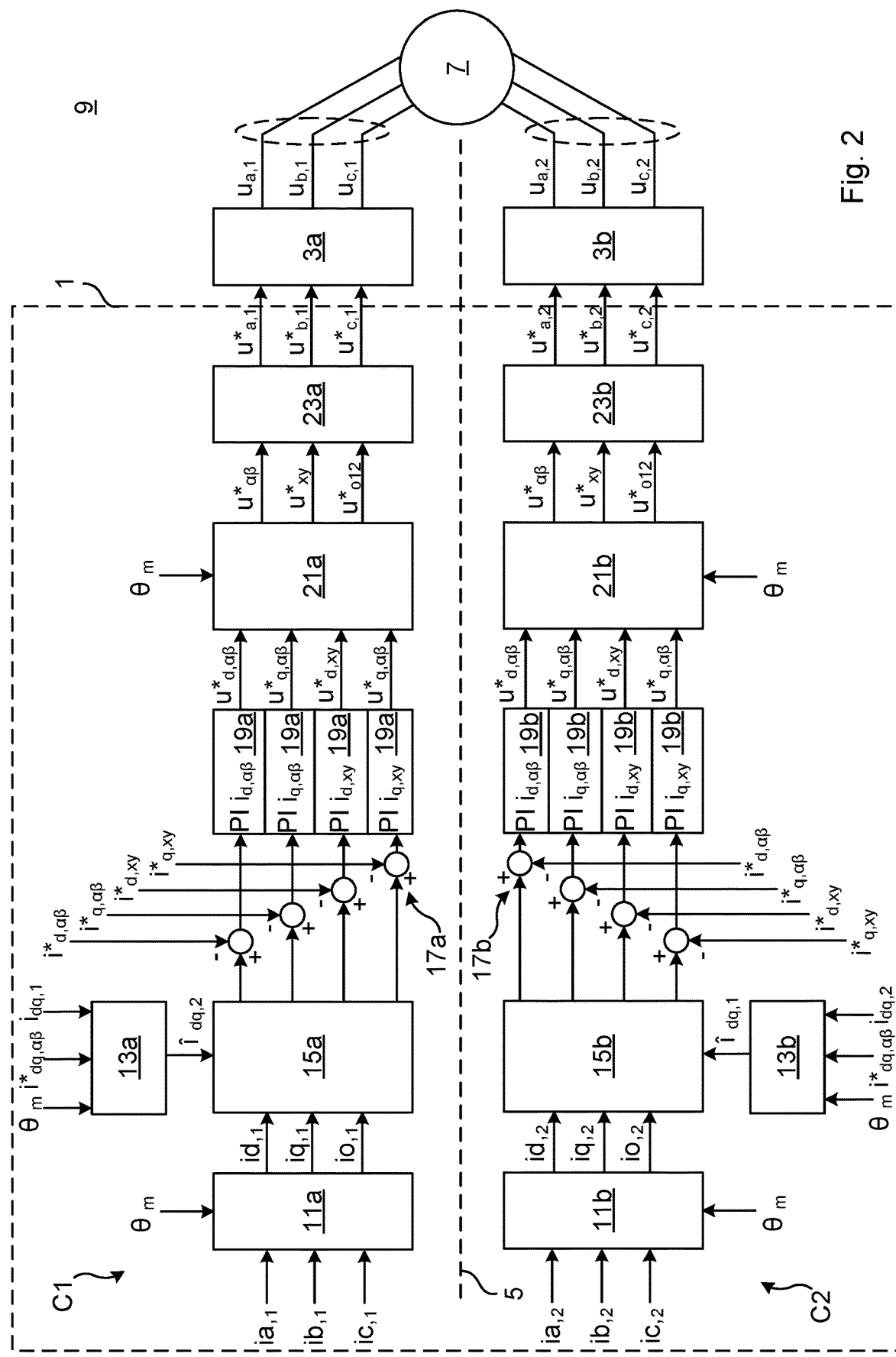
FIG. 2 schematically shows a block diagram of the control system in an electrical machine system.

FIG. 2 shows an example of a realisation of the control system 1, in terms of functional blocks. The functional blocks may be implemented in software and/or hardware. The control system 1 is configured to control n power converters 3a, 3b configured to control an electrical machine 7. The control system 1, the n power converters and the electrical machine 7 form an electrical machine system 9.

In the example in FIG. 2 the control system 1 includes exactly two controllers C1 and C2 and exactly two power converters 3a and 3b. The electrical machine system 9 in the example in FIG. 2 is a 3*2-phase electrical machine, i.e. a 6-phase electrical machine. The control system 1 could alternatively include more than two controllers and a corresponding number of power converters.

Each controller C1 and C2 is configured to control a respective power converter 3a and 3b. The first controller C1 is configured to control the first power converter 3a. The first power converter 3a is configured to control a set of three electrical phases. The second controller C2 is configured to control the second power converter 3b. The second power converter 3b is configured to control a set of three electrical phases disjoint from the set controlled by the first power converter 3a.

The control system 1 is configured to control the electrical machine 7 based on the VSD approach. The VSD approach allows describing the dynamic behaviour of certain odd harmonics in a multi-phase electrical machine. The certain odd harmonics include the fundamental frequency i.e. the $1^{st}$ harmonic, the $3^{rd}$ harmonic, the $5^{th}$ harmonic, etc. up to the number of phases m if m is an odd number or up to the number of phases minus one, i.e. m−1, if m is an even number.

A plurality of current sensors may be configured to measure the phase current $i_1, i_2, \ldots, i_{3n}$ in each phase of the 3n phases of the electrical machine 7.

The current sensors configured to measure the phase currents of a set of phases controlled by the first controller C1 are configured to send the measured currents to the first controller C1. The current sensors configured to measure the phase currents of a set of phases controlled by the first controller C1 may be configured to send the measured currents ia,1, ib,1 and ic,1 only to the first controller C1.

The current sensors configured to measure the phase current of a set of phases controlled by the second controller C2 are configured to send the measured currents ia,2, ib,2 and ic,2 to the second controller C2. The current sensors configured to measure the phase current of a set of phases controlled by the second controller C2 may be configured to send the measured currents only to the second controller C2.

The blocks 15a to 23a vertically above the line 5 operate completely independently from the blocks 15b to 23b located vertically below the line 5 in FIG. 2, except that they share the torque or speed reference with each other to find the current reference.

The first controller C1 comprises a first controller first transformation block 11a. The second controller C2 comprises a second controller first transformation block 11b. These transformation blocks 11a and 11b have the same functionality.

The first controller first transformation block 11a is configured to obtain and transform only the measured currents ia,1, ib,1 and ic,1, i.e. the phase currents of the set of three phases that the first controller C1 controls, to the rotor reference frame, i.e. the dq-frame. The rotor reference frame currents id,1, iq,1, and io,1 for this set of phases are hence obtained. io,1 denotes the zero-sequence current for the set of windings controlled by the first controller 3a.

The second controller first transformation block 11b is configured to obtain and transform only the measured currents ia,2, ib,2 and ic,2, i.e. the phase currents of the set of three phases that the second controller C2 controls, to the rotor reference frame, i.e. the dq-frame. The rotor reference frame currents id,2, iq,2, and io,2 for this set of phases are hence obtained. io,2 denotes the zero-sequence current for the set of windings controlled by the second controller 3b.

The above transformations are also based on the electrical angle θm of the electrical machine 7.

The first controller C1 comprises a first current estimator 13a. The second controller C2 comprises a second current estimator 13b. The first current estimator 13a is configured to estimate all the currents of all the other sets of three phases of the electrical machine 7 than those controlled by the first controller C1. In this example, the first current estimator 13a is configured to estimate the measured currents ia,2, ib,2 and ic,2, sent by the current sensors to the second controller C2, however in the stator reference frame or in the rotor reference frame.

The second current estimator 13b is configured to estimate all the currents of all the other sets of three phases of the electrical machine 7 than those controlled by the second controller C2. In this example, the second current estimator 13b is configured to estimate the currents ia,1, ib,1 and ic,1 sent by the current sensors to the first controller C1, however in the stator reference frame or in the rotor reference frame.

The current estimation may be based on the following equation, which provides a relationship between the VSD and DTP approaches:

$$\vec{i}_{\alpha\beta VSD} = \frac{1}{n} \sum_{i=1}^{n} \vec{i}_{\alpha\beta,iDTP}$$

where $\vec{i}_{\alpha\beta VSD}$ denotes the current vector of the fundamental frequency subspace for all the currents, in the stator reference frame. In the equation, $\vec{i}_{\alpha\beta VSD}$ is selected to be $i^*_{dq,\alpha\beta}$ transformed to the stator reference frame. $i^*_{dq,\alpha\beta}$ is the current reference vector of the fundamental frequency subspace in the rotor reference frame i.e. the current reference vector for the αβ subspace in the rotor reference frame, that is the dq-frame. $\vec{i}_{\alpha\beta,iDTP}$ is the current vector of the i:th set of measured currents in the stator reference frame, i.e. the αβ-frame. This current vector is hence not in the VSD domain. The current reference vector of the fundamental frequency subspace $i^*_{dq,\alpha\beta}$ transformed to the stator reference frame is hence equal to the sum of the measured currents in the stator reference frame for each of the n controllers, divided by n.

In the present example, where n=2, one of the terms in the sum is known as it is the output from either the first controller first transformation block 11a or from the second controller first transformation block 11b, depending which of the first current estimator 13a and the second current estimator 13b is under consideration.

For the first current estimator 13a, the term for i=1 in the sum is idq,1 transformed to the stator reference frame. The vector idq,1 consists of the rotor reference frame currents id,1, iq,1, and io,1. The transformation from the rotor reference frame to the stator reference frame can be performed based on the electrical angle θm, which is an input to both current estimators 13a and 13b. The unknown term is in this case the component for i=2 in the sum.

For the second current estimator 13b, the term for i=2 in the sum is idq,2 transformed to the stator reference frame. The vector idq,2 consists of the rotor reference frame currents id,2, iq,2, and io,2. The unknown term is in this case the component for i=1 in the sum.

Thus, by means of the equation above, all the currents of the set of three phases controlled by the second controller C2 may be estimated by the first controller C1 and all the currents of the set of three phases controlled by the first controller C1 may be estimated by the second controller C2.

The first current estimator 13a is configured to transform all the estimated currents to the rotor reference frame. The second current estimator 13b is configured to transform all the estimated currents to the rotor reference frame.

The estimated currents from the first current estimator 13a after having been transformed from the stator reference frame to the rotor reference frame are denoted $\hat{i}dq$,2. The estimated currents from the second current estimator 13b after having been transformed from the stator reference frame to the rotor reference frame are denoted $\hat{i}dq$,1.

The estimated currents $\hat{i}dq$, 2 from the first current estimator 13a are provided to a first VSD transform block 15a together with the rotor reference frame currents id,1, iq,1, and io,1, associated with the first controller C1. The first VSD transform block 15a if configured to transform these currents using the VSD transform to obtain a set of VSD currents. The control of the first power converter 3a is based on the set of VSD currents obtained from the first VSD transform block 15a.

The estimated currents $\hat{i}$dq,1 from the second current estimator 13b are provided to a second VSD transform block 15b together with the rotor reference frame currents id,2, iq,2, and io,2, associated with the second controller C2. The second VSD transform block 15b if configured to transform these currents using the VSD transform to obtain a set of VSD currents. The control of the second power converter 3b is based on the set of VSD currents obtained from the second VSD transform block 15b.

The VSD currents are sent from the first VSD transform block 15a to respective first combiners 17a to combine each VSD current with a corresponding setpoint current value in the VSD domain, i.e. in the corresponding subspaces. For example, the setpoint current value $i^*_{d,\alpha\beta}$ denotes the setpoint current value in the $\alpha\beta$-subspace of the VSD transform for the d-component of the current in the rotor reference frame. Each first combiner 17a determines the difference between the corresponding VSD current and the corresponding setpoint current value to obtain the control error.

The VSD currents are sent from the second VSD transform block 15b to respective second combiners 17b to combine each VSD current with a corresponding setpoint current value in the VSD domain, i.e. in the corresponding subspaces. The setpoint current values provided to the second combiners 17b are the same as for the first combiners 17a.

Each second combiner 17b determines the difference between the corresponding VSD current and the corresponding setpoint current value to obtain the control error.

The control errors from the first combiners 17a are provided to respective first current controllers 19a. The first current controllers 19a may be proportional-integral (PI) regulators. The first current controllers 19a process the control errors from the first combiners 17a to obtain respective control signals. The control signals are in the present example voltage references. For example, $u^*_{d,\alpha\beta}$ denotes the d-component voltage reference in the $\alpha\beta$ subspace, and $u^*_{d,xy}$ denotes the d-component voltage reference frame in the xy subspace.

The control errors from the second combiners 17b are provided to respective second current controllers 19b. The second current controllers 19b may be PI-regulators. The second current controllers 19b process the control errors from the second combiners 17b to obtain respective control signals. The control signals are in this example voltage references.

The first current regulators 19a and the second current regulators 19b may be configured to operate completely independently from each other.

The exemplified control system 1 comprises a first inverse transform block 21a and a second inverse transform block 21b. The first inverse transform block 21a is configured transform the voltage references output by the first current regulators 19a to the stator reference frame. The voltage references are at this stage still in the VSD domain. Hence, the output from the first inverse transform block 21a are the voltage reference $u^*_{\alpha\beta}$ in the stator reference frame in the $\alpha\beta$ subspace, the voltage reference $u^*_{xy}$ in the stator reference frame in the xy subspace, and the voltage reference $u^*_{o12}$ in the stator reference frame in the o1o2 subspace.

The second inverse transform block 21b is configured transform the voltage references output by the second current regulators 19b to the stator reference frame. The voltage references are at this stage still in the VSD domain. Hence, the output from the second inverse transform block 21b are the voltage reference $u^*_{\alpha\beta}$ in the stator reference frame in the $\alpha\beta$ subspace, the voltage reference $u^*_{xy}$ in the stator reference frame in the xy subspace, and the voltage reference $u^*_{o12}$ in the stator reference frame in the o1o2 subspace.

The first inverse transform block 21a may be configured to perform an inverse Park transform. The second inverse transform block 21b may be configured to perform an inverse Park transform.

The voltage references in the stator reference frame obtained from the first inverse transform block 21a are provided to a first inverse VSD transform block 23a configured to transform the voltage references from the VSD domain to the abc reference frame to obtain abc voltage references $u^*_{a,1}$, $u^*_{b,1}$, and $u^*_{c,1}$ for the phases controlled by the first power converter 3a. The abc voltage references $u^*_{a,1}$, $u^*_{b,1}$, and $u^*_{c,1}$ are provided to the first controller 3a, which based on the abc voltage references $u^*_{a,1}$, $u^*_{b,1}$, and $u^*_{c,1}$ controls the corresponding set of three phases of the electrical machine 7. In particular, the abc voltage references $u^*_{a,1}$, $u^*_{b,1}$, and $u^*_{c,1}$ are used for modulating switches of the first controller 3a to generate voltages $u_{a,1}$, $u_{b,1}$, and $u_{c,1}$ for controlling the set of windings controlled by the first controller 3a.

The voltage references in the stator reference frame obtained from the second inverse transform block 21b are provided to a second inverse VSD transform block 23b configured to transform the voltage references from the VSD domain to the abc reference frame to obtain abc voltage references $u^*_{a,2}$, $u^*_{b,2}$, and $u^*_{c,2}$ for the phases controlled by the second power converter 3b. The abc voltage references $u^*_{a,2}$, $u^*_{b,2}$, and $u^*_{c,2}$ are provided to the second controller 3b, which based on the abc voltage references $u^*_{a,2}$, $u^*_{b,2}$, and $u^*_{c,2}$ controls the corresponding set of three phases of the electrical machine 7. In particular, the abc voltage references $u^*_{a,2}$, $u^*_{b,2}$, and $u^*_{c,2}$ are used for modulating switches of the first controller 3a to generate voltages $u_{a,2}$, $u_{b,2}$, and $u_{c,2}$ for controlling the set of windings controlled by the second controller 3b.

According to one variation, each controller may obtain the measured currents associated with the other controllers. This may for example be achieved by means of a communications link such as a low bandwidth communications link, between the controllers. The sum of these measured currents may be compared with the sum of the estimated currents. The control system may be configured to conclude, on the basis that the measured currents differs from the estimated currents by more than a threshold value, that a fault is present in the electrical machine or in the communications link.

If there is a fault, for example, in a winding set, then the controller could detect the faulty winding by repeating the estimation of the sum of the currents of the all except one of the winding sets, leaving the currents of one winding set out of the equation each time. By comparing the sums of the estimated and measured currents, the faulty winding set could be located.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of controlling a 3n-phase electrical machine by means of n power converters each being controlled by a respective controller, and each power converter being configured to power a respective set of three phases of the electrical machine, wherein the method for each controller comprises:
   a) obtaining measured currents of the set of three phases of the electrical machine controlled by the respective controller,
   b) estimating all currents of all the other sets of three phases of the electrical machine, which are controlled by the other controllers,
   c) transforming the measured currents and all the estimated currents using vector space decomposition, VSD, to obtain a set of VSD currents, and
   d) controlling the corresponding power converter based on the VSD currents.

2. The method as claimed in claim 1, wherein in step b) all the currents are estimated using a current reference vector of the fundamental frequency subspace for all the power converters obtained by VSD transformation and the measured currents to obtain the estimated currents.

3. The method as claimed in claim 2, wherein the estimated currents are obtained by subtracting the measured currents from the current reference vector of the fundamental frequency subspace transformed to the stator reference frame and multiplied by n.

4. The method as claimed in claim 1, comprising transforming the measured currents and the estimated currents to a rotor reference frame and using these in step c) to obtain the VSD currents.

5. The method as claimed in claim 1, comprising combining the VSD currents with setpoint current values to obtain control errors, and obtaining control signals based on the control errors, wherein in step d) the controlling is based on the control signals.

6. The method as claimed in claim 5, comprising transforming the control signals from a rotor reference frame to the abc reference frame using inverse VSD to obtain the control signals in the abc reference frame only for the controller in question.

7. The method as claimed in claim 1, wherein n is equal to 2.

8. The method as claimed in claim 1, wherein in step a) the obtained measured currents are only of the set of three phases of the electrical machine controlled by the respective controller.

9. The method as claimed in claim 1, wherein the method for each controller further comprises:
   obtaining measured currents of the set of three phases of the electrical machine controlled by the other controller or controllers,
   comparing the sum of the measured currents of the set of three phases of the electrical machine controlled by the other controller or controllers with the sum of estimated currents, and
   concluding, on the basis that the measured currents differs from the estimated currents by more than a threshold value, that a fault is present.

10. A computer program comprising computer code which when executed by processing circuitry of a control system causes the control system to perform the steps of a method including:
   a) obtaining measured currents of the set of three phases of the electrical machine controlled by the respective controller,
   b) estimating all currents of all the other sets of three phases of the electrical machine, which are controlled by the other controllers,
   c) transforming the measured currents and all the estimated currents using vector space decomposition, VSD, to obtain a set of VSD currents, and
   d) controlling the corresponding power converter based on the VSD currents.

11. A control system for controlling a 3n-phase electrical machine by means of n power converters, each power converter being configured to control a respective set of three phases, wherein the control system comprises n controllers each configured to control a respective power converter by performing the steps of a method including:
   a) obtaining measured currents of the set of three phases of the electrical machine controlled by the respective controller,
   b) estimating all currents of all the other sets of three phases of the electrical machine, which are controlled by the other controllers,
   c) transforming the measured currents and all the estimated currents using vector space decomposition, VSD, to obtain a set of VSD currents, and
   d) controlling the corresponding power converter based on the VSD currents.

12. An electrical machine system comprising:
   a 3n-phase electrical machine,
   power converters configured to be connected to the electrical machine for controlling respective sets of three phases of the electrical machine, and
   a control system as claimed in claim 11, wherein each of the n controllers is configured to control a respective power converter.

13. The method as claimed in claim 3, wherein n is equal to 2.

14. The method as claimed in claim 2, comprising combining the VSD currents with setpoint current values to obtain control errors, and obtaining control signals based on the control errors, wherein in step d) the controlling is based on the control signals.

15. The method as claimed in claim 2, wherein n is equal to 2.

16. The method as claimed in claim 2, wherein in step a) the obtained measured currents are only of the set of three phases of the electrical machine controlled by the respective controller.

17. The method as claimed in claim 2, wherein the method for each controller further comprises:
   obtaining measured currents of the set of three phases of the electrical machine controlled by the other controller or controllers,
   comparing the sum of the measured currents of the set of three phases of the electrical machine controlled by the other controller or controllers with the sum of estimated currents, and
   concluding, on the basis that the measured currents differs from the estimated currents by more than a threshold value, that a fault is present.

* * * * *